Oct. 20, 1925.  1,557,585
H. S. HELE-SHAW
FILTER
Filed Oct. 23, 1924  3 Sheets-Sheet 1
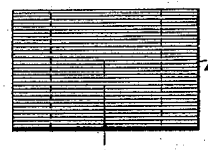
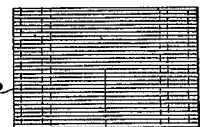
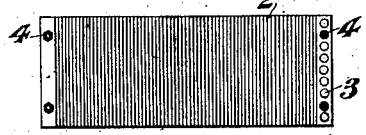
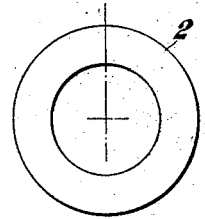
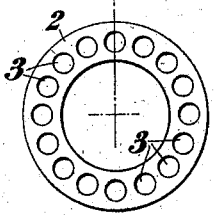
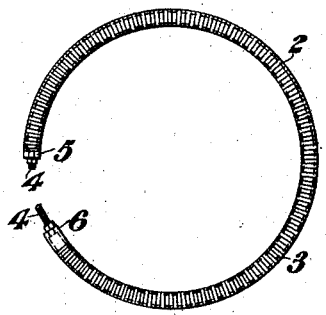
Fig.1.  Fig.2.  Fig.5.
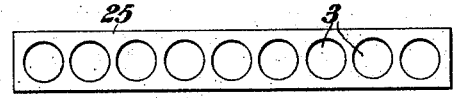
Fig.3.
Fig.4.
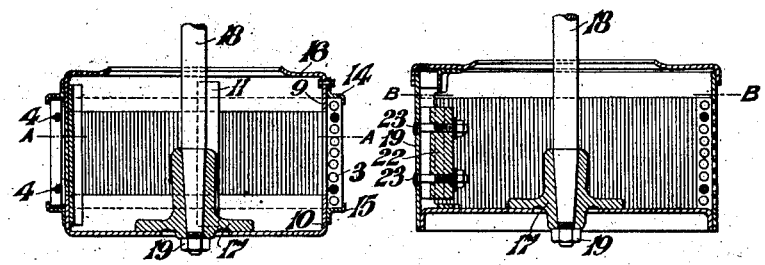
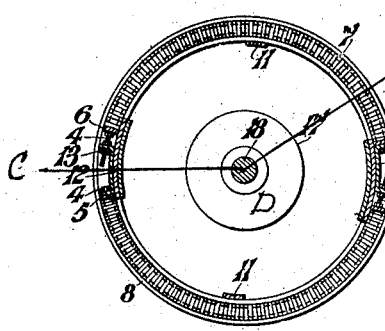
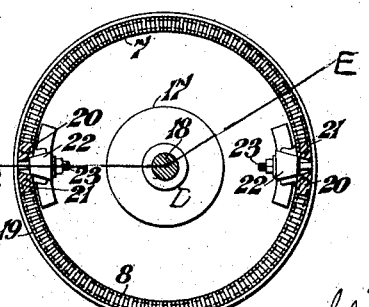
Fig.6.  Fig.7.
Inventor
Henry Selby Hele-Shaw
By B. Singer, Atty.

Oct. 20, 1925.  1,557,585
H. S. HELE-SHAW
FILTER
Filed Oct. 23, 1924  3 Sheets-Sheet 2

Inventor
Henry Selby Hele-Shaw
By B. Singer, Atty.

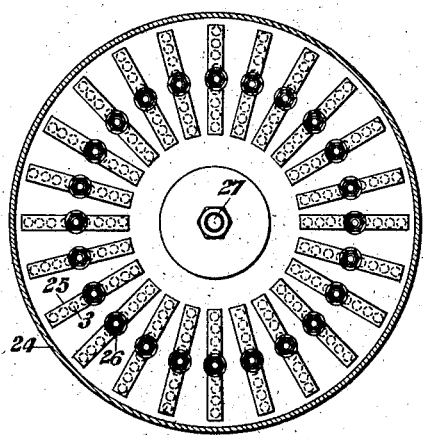

Patented Oct. 20, 1925.

1,557,585

UNITED STATES PATENT OFFICE.

HENRY SELBY HELE-SHAW, OF LONDON, ENGLAND.

FILTER.

Application filed October 23, 1924. Serial No. 745,437.

*To all whom it may concern:*

Be it known that I, HENRY SELBY HELE-SHAW, a subject of the King of Great Britain, and resident of London, England, have invented a certain new and useful Improvement in and Relating to Filters, of which the following is a specification.

This invention relates to filters or devices for separating suspended matter from fluids, and is applicable to devices of the kind set forth in the specifications of United States application Ser. No. 624,783 and British Patent No. 210,376.

The present invention comprises a filter in which a fluid is filtered by forcing it between superposed sheets of material, wherein the fluid pressure to effect such filtration or separation of suspended matter is obtained in the filter itself by centrifugal force.

The sheets which may be of paper as described in the aforesaid specification may be in the form of annular discs superposed to form a pile and supported in a rotatable filter press. The discs may be so arranged that the fluid passes between the sheets throughout their width or they may be perforated to form longitudinal holes through the pile, so that the filtered fluid can be passed from one or both sides of the pile of sheets to the perforations, or passed in the reverse direction.

The sheets may however, be arranged in perforated vertical pile presses arranged radially in a rotatable vessel.

In applying the invention to the separation of suspended matter from emulsions or mixtures separable by a centrifugal separator, the filtering device may be combined with a centrifugal separator. The filtrate from the filter may be discharged directly into the bowl of the separator. This may be effected by designing the centrifugal separator as an annular chamber surrounding the centrifugal fluid pressure filtering device and so that the filtrate from the filtering device will pass directly into the centrifugal separator, the centrifugal separator being of the cream separator type or of any other suitable type.

It is found in practice that with some liquids it is preferable to feed them into the centrifugal machine when the same has attained a given speed, this may be effected by providing on the machine a speed governor adapted to open a valve through which the liquid is fed into the machine, when the machine has attained the desired speed.

Figure 8:
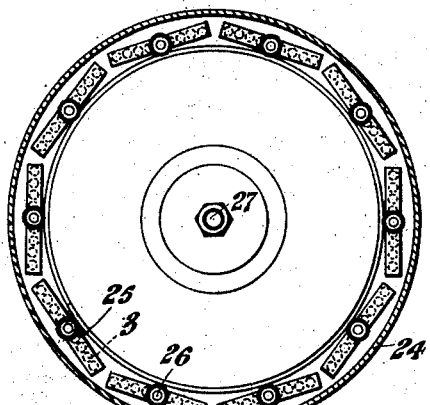
Figure 9:
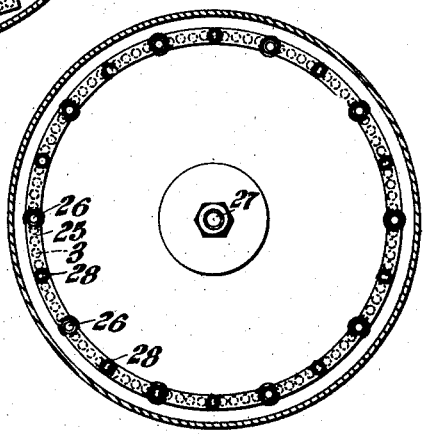
Figure 12:
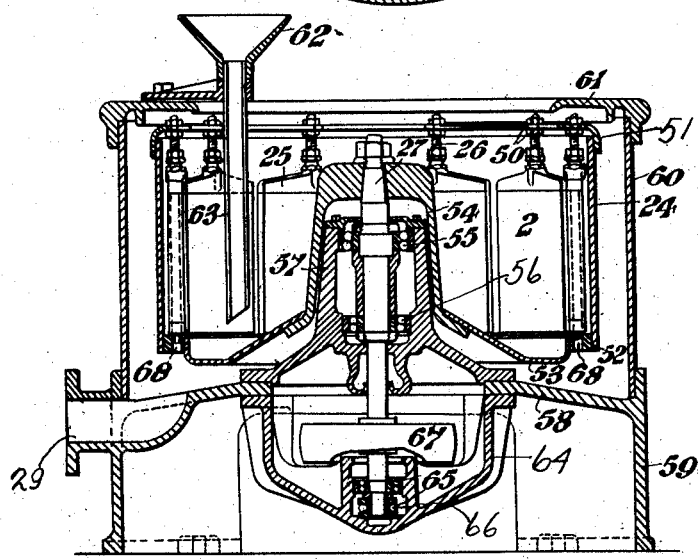

The accompanying drawings illustrate various modifications and details of the invention, Fig. 1 being an elevation and plan of a filter pile of sheets in the form of annular discs. Fig. 2 illustrates similar views of an annular filter pile of sheets, the sheet being perforated. Fig. 3 is a plan of a rectangular sheet of which a number are held together to form a unit of a filter press. Fig. 4 is a plan of a sheet similarly perforated to the sheet shown in Fig. 3 but curved instead of rectangular so as to form a section of a hollow cylindrical pile. Figure 5 illustrates an elevation and plan of a circumferential filter pile of sheets. Figure 6 is a sectional elevation and a plan of a rotary element having a circumferential pile of sheets of the type shown in Figure 5, the circumferential pile being arranged on the outside of a rotary drum or frame, the elevation being a section through C D E of the plan. Figure 7 illustrates a rotary element similar to Figure 6 but with the circumferential pile of sheets arranged on the inner side of a rotary drum, the elevation as in Figure 6 being a section through C D E of the plan. Fig. 8 is a plan illustrating a number of flat strip pile sheet filter pressure units arranged circumferentially in a rotary casing. Figure 9 shows a rotary casing containing a number of filter press units made up of sheets of the kind shown in Figure 4. Figure 10 is a similar device to Figure 8 with the press units arranged radially. Figure 11 is a sectional view of a complete filter with a pile of sheets as in Figure 1. Figure 12 illustrates a sectional elevation and Figure 13 a portion of a plan of a complete centrifugal machine having filter units of the kind illustrated in Figure 8.

The annular pile of sheets 2 shown in Figure 1 may be mounted between press heads rotatable on a vertical shaft and closed at the lower or both ends so that fluid passed into the central space through a suitable inlet will when the device is rotated be driven by centrifugal force against the inner walls of the annular pipe and then between the sheets of the pile, the filtrate passing to the outer surface from which it may be collected in an outer casing, while the separated matter is retained on the inner walls of the pile and may be removed therefrom in any suitable manner.

The pile of annular sheets 2 provided with perforations 3 as shown in Figure 2 may be substituted for the annular pile in a machine described with reference to Figure 1, the filtrate being arranged to pass between the sheets into the perforations from which it passes to any suitable outlets.

In Figure 5 the pile of sheets 2 is arranged circumferentially by threading a number of strips as shown in Figure 3 on an enlarged scale, on curved or flexible bolts 4, so that the sheets can be held between end plates 5 and 6, 5 being a blank end while 6 is hollow so as to provide a common outlet to all the perforations 3.

In Figure 6 the circumferential pile of sheets is divided into two portions 7 and 8 each provided with curved or flexible bolts 4 and held on the outer periphery of a drum consisting of an upper portion 9 and a lower portion 10 held together at the desired distance apart by ties 11. The end plates 5 and 6 of each pile 7 and 8 are connected together by channel members 12 through which the bolts 4 pass, one end of each of the bolts 4 being extended to pass through one side or flange of the channel member 12 in which it is held by adjusting nuts 13, 13 whereby the two portions 7 and 8 of the pile are positioned on the drum in upper and lower channels 14 and 15 secured to the corresponding upper and lower portions 9 and 10 of the drum.

The upper portion 9 of the drum is curved to form a flange 16 to retain the fluid within the drum during its rotation, and the base of the drum is closed by a flanged member 17 in the boss portion of which is fixed the vertical power shaft 18 by a nut 19.

The drum is rotated by the shaft 18 at the speed required to give the desired fluid pressure in the fluid introduced through the opening in the top of the drum. The fluid pressure desired varies with different fluids under treatment and must be sufficient to enable the filtrate to pass between the sheets to the draining perforations 3 from which it flows into any suitable reservoir placed below the drum.

In the modification of this device as shown in Figure 7 the two portions 7 and 8 of the circumferential pile of sheets are held against the inner surface of a drum 19 by end pieces 20 and 21 which have oppositely inclined faces adapted to be engaged by wedges 22. The wedges 22 are moved radially by bolts 23 in such a manner as to compress the sheets of the pile together at the same time that the pile is being held against the inner surface of the drum 19.

In the device illustrated by Figure 8 the sheets forming the pile 2 are of the kind shown in Figure 3 and these piles are fixed vertically at uniform distances apart around the inside of a rotatable drum 24 by press heads 25 held in the drum by bolts 26. The drum is mounted on a vertical shaft 27 and is rotated at a speed to produce by centrifugal force a fluid pressure sufficient to carry the filtrate or separated portion of the fluid introduced into the drum, between the sheets, so that the filtrate will pass through the perforations 3 into a suitable outlet.

Figure 9 illustrates a modification of Figure 8 wherein the sheets are curved as in Figure 4 and are arranged end to end between supporting members 28 so as to form a hollow cylindrical member into which the fluid under treatment is introduced.

In the modification shown in Figure 10 the piles of sheets are of the same kind as shown in Fig. 8 but are arranged radially instead of circumferentially. In the operation of this device the separated matter first deposits on both sides of the piles near to the inner surface of the drum wherein the fluid pressure is greatest, and as the deposit thickens sufficiently to prevent the passage of the filtrate it gradually accumulates on the surfaces of the piles nearer the centre of the drum and so forms a deposit of uniform depth throughout the width of the pile, the drum being rotated at an increased speed when necessary to ensure depositions on the portions nearer the centre of the drum.

A machine for use with an annular pile of sheets as shown in Fig. 1 is illustrated in the sectional elevation by Fig. 11, wherein 30 is a standard on which is mounted a casing 31 from which depends a tubular portion 32 carrying the roller bearings 33 and 34 and also a thrust ball bearing 35 of the shaft 18 which carries at its upper end the drum 24 and at its lower end a driving pulley 36.

The liquid to be filtered is passed from a reservoir 37 down a central tube 38 into the central space in the pile 2 of annular sheets which is compressed between the bottom of the drum 24 and a press head 39 by means of a screw gland 40 operating in an annular screw nut 41 screwed tightly into the top of the drum 24.

During the rotation of the drum 24 the filtrate passes radially between the sheets of the pile 2 into the annular space between it and the drum 24 and then upwards through the holes 42 in the annular nut 41 and then through the holes 43 in a conical cover 44 screwed on the top of the drum 24, and passes finally down the outside of the conical cover 44 to the outlet 45, the central inlet tube 38 being fixed on the annular nut 39 by a gland nut 46 and screwed tube or sleeve 47.

In Figs. 12 and 13 is illustrated a more complete machine on the lines described with reference to Fig. 8, the corresponding parts bearing the same numerals.

In this example the bolts 26 at the top of the press heads 25 of the piles 2 are held by lock nuts 50 in an angular shaped ring 51 secured to the top of the drum 24, the lower end of bolts 26 being held in a ring 52 connecting the bottom 53 of the drum 24 with its lower edge.

The driving shaft 27 of the drum 24 is secured in the crown of a bell-shaped member 54 connected at its lower edge to the bottom 53 of the drum. The bearings 55 and 56 of the shaft 27 are mounted in a standard 57 secured over an opening in the top 58 of the base member 59, the said top 58 forming the bottom of an outer fixed drum or casing 60 on which is fixed an annular cover 61. Supported from the cover 61 is a feeding funnel 62 from which extends downwards into the drum a feed pipe 63. The base member 59 is provided with an outlet 29 and with a bracket member 64 secured under the standard 57 and in which is mounted the bearings 65 and 66 of the shaft 27 and also the driving pulley 67.

The liquid to be treated is delivered into the funnel 62 and passes down the tube 63 into the drum 24. The drum 24 is rotated by the pulley 67 from any convenient source of power at a speed sufficient to produce in the liquid at the surfaces of the piles 2 a fluid pressure sufficient to force the filtrate between the sheets of the piles into the passages 3 from which it flows downwards through openings 68 into the outer drum or casing 60 and passes from the casing 60 through the outlet 29 into any convenient receptacle.

What I claim and desire to secure by Letters Patent is:—

1. A filter comprising a number of superposed sheets of flexible material held together between press heads so that filtration takes place between the sheets, means for varying the pressure between the sheets, a rotary carrier for supporting the sheets at a uniform distance from its centre, means for rotating the rotary carrier at such a speed that the hydraulic pressure caused by the centrifugal force in the rotating fluid will force the fluid to be filtered between the flexible sheets leaving the separated matter on the edges of the sheets, the degree of filtration being regulatable by the means for varying the pressure between the sheets.

2. A filter comprising a number of piles of similarly perforated rectangular sheets of material held between upper and lower press heads the lower press heads being perforated similarly to the sheets, means for varying the pressure between the sheets, a rotary drum for supporting the piles of sheets at uniform distances from its axis and provided with outlets for the filtrate, the perforations in the sheets when superposed registering with one another and with the outlets in the lower press heads and in the drum, means for rotating the drum at such a speed that the hydraulic pressure caused by the centrifugal force in the fluid will force the filtrate from the separated matter between the sheets and into perforations from which it will drain through the outlets in the drum.

3. A filter comprising a number of superposed similarly perforated rectangular sheets of flexible material held together to form a number of separate filter presses, an open topped rotary drum provided at its upper edge with an inwardly extending flange and in its base with outlets for the filtrate, the presses being supported at their upper portions by the flange extending inwards from the top edge of the drum and with the perforations in the lower press heads in communication with the outlets.

4. A filter comprising a number of superposed similarly perforated rectangular sheets of flexible material held together between upper solid and lower perforated press heads to form a number of separate filter presses, an open topped rotary drum having at the outer portion of its base outlets for the filtrate and at its inner portion an inwardly extending bell-shaped member, a vertical power shaft, and a bearing standard, the presses being supported inside the drum near its walls with their holes in the lower press heads in communication with the outlets and the top of the vertical power shaft fixed to the upper end of the bell-shaped chamber, the power shaft being supported in bearings in the standard.

5. A filter comprising a number of superposed similarly perforated rectangular sheets of flexible material held together between upper solid and lower perforated press heads to form a number of separate filter presses, a rotary drum mounted on a vertical power shaft, a base upon which said shaft is mounted, said base having outlets for the filtrate, and a bearing standard, the pressheads being supported inside the drum near its walls with the holes in the lower press heads in communication with the outlets and the vertical power shaft mounted in the bearings in the bearing standard, the bearing standard being fixed on the supporting base so that the filtrate outlets from the drum will discharge into the drain channel in the supporting base.

6. A filter comprising a number of superposed similarly perforated rectangular sheets of flexible material held together between upper solid and lower perforated press heads to form a number of separate filter presses, a rotary drum mounted on a vertical power shaft and having in its base outlets for the filtrate, a bearing carrying supporting base, an outer fixed drum, and an inlet pipe for the liquid to be filtered, the presses being supported inside the drum near its walls with the holes in the lower press heads in communication with the outlets and the vertical power shaft mounted in the bearings carried by the supporting base and supporting the drum with its outlets above the drain channel in the supporting base, and the inlet pipe supported from the outer fixed drum with its lower end extending into the rotary drum so as to deliver the liquid to be filtered into the lower portion of the drum.

In witness whereof I affix my signature.

HENRY SELBY HELE-SHAW.